US012276201B2

(12) United States Patent
Ji et al.

(10) Patent No.: US 12,276,201 B2
(45) Date of Patent: Apr. 15, 2025

(54) TURBINE CLEANING SYSTEM

(71) Applicant: YANTAI JEREH PETROLEUM EQUIPMENT & TECHNOLOGIES CO., LTD., Shandong (CN)

(72) Inventors: Xiaolei Ji, Shandong (CN); Rikui Zhang, Shandong (CN); Shanwu Fu, Shandong (CN); Peng Zhang, Shandong (CN); Sheng Chang, Shandong (CN); Chunqiang Lan, Shandong (CN); Yipeng Wu, Shandong (CN); Xincheng Li, Shandong (CN); Yuxuan Sun, Shandong (CN)

(73) Assignee: Yantai Jereh Petroleum Equipment & Technologies Co., Ltd., Yantai (CN)

( * ) Notice: Subject to any disclaimer, the term of this patent is extended or adjusted under 35 U.S.C. 154(b) by 0 days.

(21) Appl. No.: 17/587,621

(22) Filed: Jan. 28, 2022

(65) Prior Publication Data

US 2022/0243613 A1 Aug. 4, 2022

(30) Foreign Application Priority Data

Jan. 29, 2021 (CN) ......................... 202120267373.0

(51) Int. Cl.
*F01D 25/00* (2006.01)
*B08B 3/02* (2006.01)
*B08B 13/00* (2006.01)

(52) U.S. Cl.
CPC .............. *F01D 25/002* (2013.01); *B08B 3/02* (2013.01); *B08B 13/00* (2013.01); *F05D 2220/30* (2013.01)

(58) Field of Classification Search
CPC ..... F01D 25/002; F05D 2220/30; B08B 3/02; B08B 13/00
See application file for complete search history.

(56) References Cited

U.S. PATENT DOCUMENTS

2008/0178909 A1* 7/2008 Alvestig .................. B08B 3/02 134/44
2013/0199040 A1* 8/2013 Dudeck ............. G02B 23/2492 29/889.1
2016/0222820 A1* 8/2016 Truesdale ............ F01D 25/002
2017/0268377 A1* 9/2017 Flynn ........................ B08B 9/00
2018/0283209 A1* 10/2018 Eriksen .................... B64F 5/30

(Continued)

*Primary Examiner* — David E Sosnowski
*Assistant Examiner* — Aye S Htay
(74) *Attorney, Agent, or Firm* — Crowell & Moring LLP

(57) ABSTRACT

A turbine engine cleaning system is disclosed. In the turbine engine cleaning system, a temperature sensor obtains a temperature within a combustion chamber of the turbine engine; a cleaning agent storage device stores cleaning agent; a cleaning agent delivery device is connected between the cleaning agent storage device and the combustion chamber of the turbine engine, and includes a pipe and a driver mechanism; the pipe includes a front-end pipe and a rear-end pipe; the front-end pipe is connected to the cleaning agent storage device; the rear-end pipe is connected to the front-end pipe and the combustion chamber; the driver mechanism is connected to the front-end pipe and drives the cleaning agent to enter the combustion chamber from the cleaning agent storage device by the front-end pipe and the rear-end pipe to clean components when the temperature within the combustion chamber is less than or equal to a predetermined temperature.

15 Claims, 4 Drawing Sheets

(56) References Cited

U.S. PATENT DOCUMENTS

| | | | | |
|---|---|---|---|---|
| 2019/0063374 | A1* | 2/2019 | Sher | F02B 51/02 |
| 2020/0040763 | A1* | 2/2020 | Wang | B08B 9/00 |
| 2020/0256208 | A1* | 8/2020 | Shahbudin | F01D 25/002 |

* cited by examiner

TURBINE CLEANING SYSTEM

The application claims priority to the Chinese patent application No. 202120267373.0 filed on Jan. 29, 2021, the entire disclosure of which is incorporated herein by reference as part of the present application.

TECHNICAL FIELD

At least one embodiment of the present disclosure relates to a turbine engine cleaning system.

BACKGROUND

Turbine engine includes compressor, combustion chamber and turbine. The compressor is usually divided into low-pressure compressor and high-pressure compressor. The airflow entering the compressor is compressed into a high-density, high-pressure, low-speed airflow in the compressor to increase the efficiency of the engine. After the airflow enters the combustion chamber, fuel is injected by the fuel supply nozzle, and the fuel is mixed with the airflow and burned in the combustion chamber. The highly heated exhaust gases from the combustion drive the turbine to rotate. Impurities such as salt, oil, stains and other mixtures in the air may adhere to the blades of the compressor, which reduces the performance of the compressor; tar and other substances from the fuel combustion may adhere to the turbine blades, which reduces the performance of the turbine. Therefore, these impurities need to be cleaned.

SUMMARY

At least one embodiment of the present disclosure provides a turbine engine cleaning system, the turbine engine cleaning system comprises: a temperature sensor, a cleaning agent storage device, and a cleaning agent delivery device. The temperature sensor is configured to obtain a temperature within a combustion chamber of the turbine engine; the cleaning agent storage device is configured to store cleaning agent; the cleaning agent delivery device is connected between the cleaning agent storage device and the combustion chamber of the turbine engine and includes a pipe and a driver mechanism; the pipe includes a front-end pipe and a rear-end pipe, the front-end pipe is connected to the cleaning agent storage device, the rear-end pipe is connected to the front-end pipe and the combustion chamber; the driver mechanism is connected to the front-end pipe and configured to drive the cleaning agent to be delivered from the cleaning agent storage device into the combustion chamber by the front-end pipe and the rear-end pipe, to clean a component to be cleaned in a case where the temperature within the combustion chamber is less than or equal to a predetermined temperature.

For example, in the turbine engine cleaning system provided by at least one embodiment of the present disclosure, the predetermined temperature is an ambient temperature.

For example, in the turbine engine cleaning system provided by at least one embodiment of the present disclosure, the temperature sensor comprises an infrared temperature sensor, and the temperature sensor is outside the combustion chamber.

For example, in the turbine engine cleaning system provided by at least one embodiment of the present disclosure, the turbine engine cleaning system further comprises a control unit, the control unit is connected to the temperature sensor and the cleaning agent delivery device, configured to receive temperature information within the combustion chamber obtained by the temperature sensor, and configured to control the driver mechanism to drive the cleaning agent to be delivered from the cleaning agent storage device to the combustion chamber by the front-end pipe and the rear-end pipe in the case where the temperature within the combustion chamber is less than or equal to the predetermined temperature.

For example, in the turbine engine cleaning system provided by at least one embodiment of the present disclosure, the turbine engine cleaning system further comprises a pressure sensor and a pressure adjustment device, the pressure sensor is configured to obtain a pressure within the pipe; and the pressure adjustment device is configured to adjust the pressure within the pipe; the control unit is further connected to the pressure sensor, the pressure adjustment device and the cleaning agent delivery device, and is configured to obtain the pressure within the pipe, and is configured to control the driver mechanism to drive the cleaning agent to be delivered from the storage device into the combustion chamber in a case where the pressure is greater than or equal to a predetermined pressure, and is configured to control the driver mechanism to stop driving the cleaning agent to be delivered from the cleaning agent storage device into the combustion chamber, and control the pressure adjustment device to adjust the pressure within the pipe to reach the predetermined pressure, in a case where the pressure is lower than a predetermined pressure.

For example, in the turbine engine cleaning system provided by at least one embodiment of the present disclosure, the turbine engine cleaning system further comprises an image sensor; the image sensor is configured to obtain image information of a surface to be cleaned of the component to be cleaned before cleaning the turbine engine; the control unit is further configured to obtain the image information, to identify a degree of cleanliness of the surface to be cleaned fed back by the image information, and to control the pressure adjustment device to adjust the pressure within the pipe according to the degree of cleanliness.

For example, in the turbine engine cleaning system provided by at least one embodiment of the present disclosure, the rear-end pipe comprises a first sub-rear-end pipe and a second sub-rear-end pipe, the first end of the first sub-rear-end pipe and the first end of the second sub-rear-end pipe are both communicated with the front-end pipe, the second end of the first sub-rear-end pipe is at a first position within the combustion chamber of the turbine engine and is configured to feed the cleaning agent into the combustion chamber at the first position, the second end of the second sub-rear-end pipe is at a second position within the combustion chamber of the turbine engine and is configured to feed the cleaning agent into the combustion chamber at the second position, the first position is different from the second position.

For example, in the turbine engine cleaning system provided by at least one embodiment of the present disclosure, the turbine engine cleaning system further comprises a moving device, the moving device is configured to move a position of the second end of the first sub-rear-end pipe and a position of the second end of the second sub-rear-end pipe.

For example, in the turbine engine cleaning system provided by at least one embodiment of the present disclosure, the cleaning agent storage device comprises a first storage device and a second storage device. The first storage device, storing a first cleaning agent; and the second storage device, storing a second cleaning agent; the front-end pipe comprises a first sub-front-end pipe and a second sub-front-end pipe, the first end of the first sub-front-end pipe is connected to the first storage device and the first end of the second sub-front-end pipe is connected to the second storage device; the cleaning agent delivery device further comprises a mixer, the mixer is connected to a second end of the first sub-front-end pipe, a second end of the second sub-front-end pipe and the rear-end pipe, wherein the rear-end pipe is between the mixer and the combustion chamber, the first cleaning agent enters the mixer via the first sub-front-end pipe, and the second cleaning agent enters the mixer via the second sub-front-end pipe, and the first cleaning agent and the second cleaning agent are mixed in the mixer.

For example, in the turbine engine cleaning system provided by at least one embodiment of the present disclosure, the pressure sensor is on the rear-end pipe and is configured to obtain a pressure within the rear-end pipe.

For example, in the turbine engine cleaning system provided by at least one embodiment of the present disclosure, the pressure adjustment device comprises a first sub-pressure adjustment device and a second sub-pressure adjustment device. The first sub-pressure adjustment device is on the first sub-front-end pipe and configured to adjust a pressure within the first sub-front-end pipe; and the second sub-pressure adjustment device is on the second sub-front-end pipe and configured to adjust a pressure within the second sub-front-end pipe.

For example, in the turbine engine cleaning system provided by at least one embodiment of the present disclosure, the turbine engine cleaning system further comprises a first cleaning agent adjustment device and a second cleaning agent adjusting device. The first cleaning agent adjustment device, configured to control an amount of first cleaning agent entering the first sub-front-end pipe; and the second cleaning agent adjusting device, configured to control an amount of the second cleaning agent entering the second sub-front-end pipe; the control unit is connected to the temperature sensor, the first cleaning agent adjustment device and the second cleaning agent adjustment device, and is configured to control the amount of first cleaning agent entering the first sub-front-end pipe and the amount of the cleaning agent entering the second sub-front-end pipe according to the predetermined temperature.

For example, in the turbine engine cleaning system provided by at least one embodiment of the present disclosure, the turbine engine cleaning system further comprises a cleaning agent recovery device and a detection device. The cleaning agent recovery device which is connected to the combustion chamber of the turbine engine and configured to recover cleaning agent discharged from the combustion chamber; and the detection device, configured to detect a degree of contamination of the cleaning agent in the cleaning agent recovery device; the control unit is further connected to the detection device and the cleaning agent delivery device, is configured to obtain the degree of cleanliness, and is configured to control the driver mechanism to drive the cleaning agent to be delivered from the cleaning agent storage device into the combustion chamber to continue cleaning in a case where the degree of contamination is higher than a predetermined degree of contamination, and is configured to control the driver mechanism to stop driving the cleaning agent from the cleaning agent storage device to be delivered into the combustion chamber to stop cleaning in a case where the degree of contamination is lower than or equal to the predetermined degree of contamination.

For example, in the turbine engine cleaning system provided by at least one embodiment of the present disclosure, the component to be cleaned comprises a turbine blade within the combustion chamber, the cleaning agent is delivered to the turbine blade to clean the turbine blades; or, the turbine engine comprises a compressor, and the rear-end pipe is further connected to inside of the compressor, to clean the component to be cleaned inside the compressor.

At least one embodiment of the present disclosure further provides a cleaning method adopting the turbine engine cleaning system, the cleaning method comprises: obtaining the temperature within the combustion chamber of the turbine engine by the temperature sensor; driving the cleaning agent to be delivered from the cleaning agent storage device into the combustion chamber through the front-end pipe and the rear-end pipe to clean the component to be cleaned in the case where the temperature within the combustion chamber is less than or equal to the predetermined temperature.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

Figure 1:
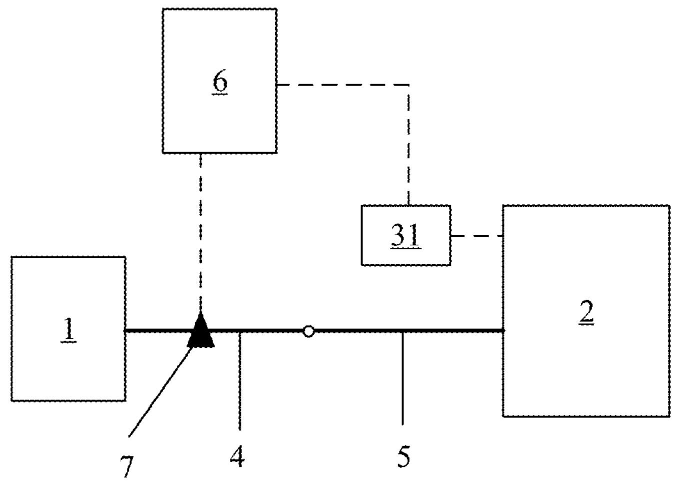
FIG. 1 is a schematic diagram of a turbine engine cleaning system provided by an embodiment of the present disclosure.

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment (s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "inside," "outside" and the like are only used to indicate relative position relationship, and when the position of the object which is described is changed, the relative position relationship may be changed accordingly.

At least one embodiment of the present disclosure provides a turbine engine cleaning system, the turbine engine cleaning system comprises: a temperature sensor, a cleaning agent storage device, and a cleaning agent delivery device. The temperature sensor is configured to obtain a temperature within a combustion chamber of the turbine engine; the cleaning agent storage device is configured to store cleaning agent; the cleaning agent delivery device is connected between the cleaning agent storage device and the combustion chamber of the turbine engine and includes a pipe and a driver mechanism; the pipe includes a front-end pipe and a rear-end pipe, the front-end pipe is connected to the cleaning agent storage device, the rear-end pipe is connected to the front-end pipe and the combustion chamber; the driver mechanism is connected to the front-end pipe and configured to drive the cleaning agent to be delivered from the cleaning agent storage device into the combustion chamber by the front-end pipe and the rear-end pipe, to clean a component to be cleaned in a case where the temperature within the combustion chamber is less than or equal to a predetermined temperature.

Hereinafter, the turbine engine cleaning system provided by the embodiments of the present disclosure is described in detail in conjunction with the accompanying drawings.

Exemplarily, FIG. 1 is a schematic diagram of a turbine engine cleaning system provided by an embodiment of the present disclosure. As illustrated in FIG. 1, the turbine engine cleaning system includes: a temperature sensor 31, a cleaning agent storage device 1, and a cleaning agent delivery device. The temperature sensor 31 is configured to obtain a temperature within the combustion chamber 2 of the turbine engine; the cleaning agent storage device 1 is configured to store cleaning agent; the cleaning agent delivery device is connected between the cleaning agent storage device 1 and the combustion chamber 2 of the turbine engine and includes a pipe and a driver mechanism 7; the pipe includes a front-end pipe 4 and a rear-end pipe 5, the front-end pipe 4 is connected to the cleaning agent storage device 1, and the rear-end pipe 5 is connected to the front-end pipe 4 and the combustion chamber 2; the driver mechanism 7 is connected to the front-end pipe 4 and configured to drive the cleaning agent to be delivered from the cleaning agent storage device 1 into the combustion chamber 2 through the front-end pipe 4 and the rear-end pipe 5 to clean a component to be cleaned in the case where the temperature within the combustion chamber 2 is less than or equal to a predetermined temperature. Because the temperature within the combustion chamber of the turbine engine is high after the fuel is burned in the combustion chamber, if the component(s) inside the combustion chamber is cleaned at a high temperature, it is easy to cause damage to the component inside the combustion chamber. In the cleaning system provided by embodiments of the present disclosure, the temperature within the combustion chamber can be automatically detected, and the temperature within the combustion chamber can gradually decreases, and in the case that the temperature within the combustion chamber is less than or equal to a predetermined temperature, the cleaning agent is driven by a driver mechanism to enter the combustion chamber 2 from the cleaning agent storage device 1 to clean the components to be cleaned, which can avoid damage to the component in the combustion chamber caused by cleaning in a high temperature environment.

In the embodiment of the present disclosure, at least two sections of pipes, i.e., the front-end pipe 4 and the rear-end pipe 5, are used as the delivery device, which is more flexible compared to one integral pipe. On the one hand, it is convenient to repair and replace the pipes, and on the other hand, other components can be connected between the front-end pipe 4 and the rear-end pipe 5 to achieve more functions, such as connecting the liquid storage device between the front-end pipe 4 and the rear-end pipe 5 to carry out mixing, transfer, buffering, etc. of the cleaning agent.

For example, the component to be cleaned includes a turbine blade located within the combustion chamber 2, and the cleaning agent is delivered to the turbine blade to clean the turbine blade.

For example, the turbine engine further includes a compressor, and the rear-end pipe 5 may be connected to the inside of the compressor to clean the component to be cleaned inside the compressor, for example, the component to be cleaned inside the compressor includes the blades of the compressor, so that impurities such as salt, oil, stains and other mixtures that enter the compressor from the air are removed. After the fuel is burned, the temperature within the compressor is influenced by the temperature within the combustion chamber, and in the case that the temperature within the combustion chamber is reduced to less than or equal to the predetermined temperature, the temperature within the compressor is also reduced to less than or equal to the predetermined temperature.

For example, the predetermined temperature is an ambient temperature. The ambient temperature refers to the temperature of the environment outside the turbine engine, such as room temperature. Before the turbine engine is to be cleaned, the ambient temperature can be automatically detected or manually entered and is used as a standard for temperature judgment. For example, the ambient temperature ranges from −40 C.° to 40 C°.

For example, as illustrated in FIG. 1, the turbine engine cleaning system further includes a control unit 6, the control unit 6 is connected to the temperature sensor 31 and the cleaning agent delivery device, and is configured to receive temperature information within the combustion chamber 2 obtained by the temperature sensor 31, and is configured to control the driver mechanism 7 to drive the cleaning agent to be delivered from the cleaning agent storage device 1 into the combustion chamber 2 through the front-end pipe 4 and the rear-end pipe 5 in the case that the temperature within the combustion chamber 2 is less than or equal to the predetermined temperature.

Figure 4:
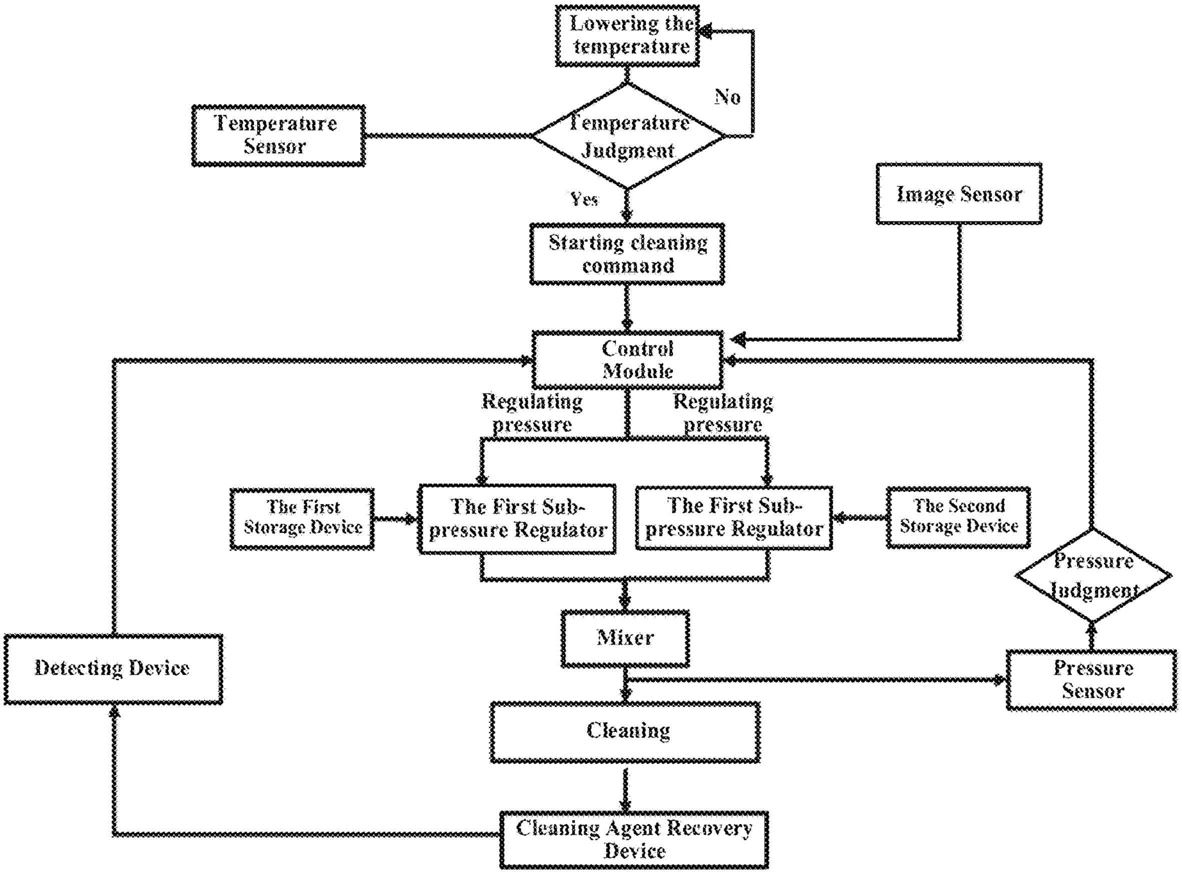
FIG. 4 shows a schematic flow diagram of a turbine engine cleaning method provided by an embodiment of the present disclosure.

For example, referring to FIG. 4, the control unit 6 includes a temperature judgment module and a control module; the temperature judgment module is configured to determine whether the temperature within the combustion chamber obtained by the temperature sensor 31 is less than or equal to a predetermined temperature. If the judgment result is yes, a start cleaning command is executed under control of the control module, and the control module controls the driver mechanism 7 to drive the cleaning agent to be delivered from the cleaning agent storage device 1 into the combustion chamber 2 for cleaning through the front-end pipe 4 and the rear-end pipe 5; if the judgment result is no, the control module controls the driver mechanism 7 not to work, so that cleaning is not performed, and the combustion chamber continues to cool. For example, by setting a predetermined detection interval, the temperature inside the combustion chamber obtained by the temperature sensor 31 is judged as described above by the judgment module at predetermined intervals.

For example, the temperature sensor includes an infrared temperature sensor, the temperature sensor is located outside the combustion chamber 2, the infrared sensor may not directly contact the measured temperature object, so that it may be set outside the combustion chamber 2 to sense the temperature inside the combustion chamber 2, in order to prevent the temperature sensor from directly contacting the high temperature environment inside the combustion chamber, reducing the requirement for the temperature sensor's high temperature resistance performance. Of course, in some embodiments, the temperature sensor may also be located inside the touch combustion chamber.

For example, the driver mechanism 7 includes a pump, the pump is connected to the cleaning agent storage device 1 and the pipe, and is configured to work under the control of the control unit 6 to transport the cleaning agent from the cleaning agent storage device 1 to the combustion chamber via the pipe.

Figure 2:
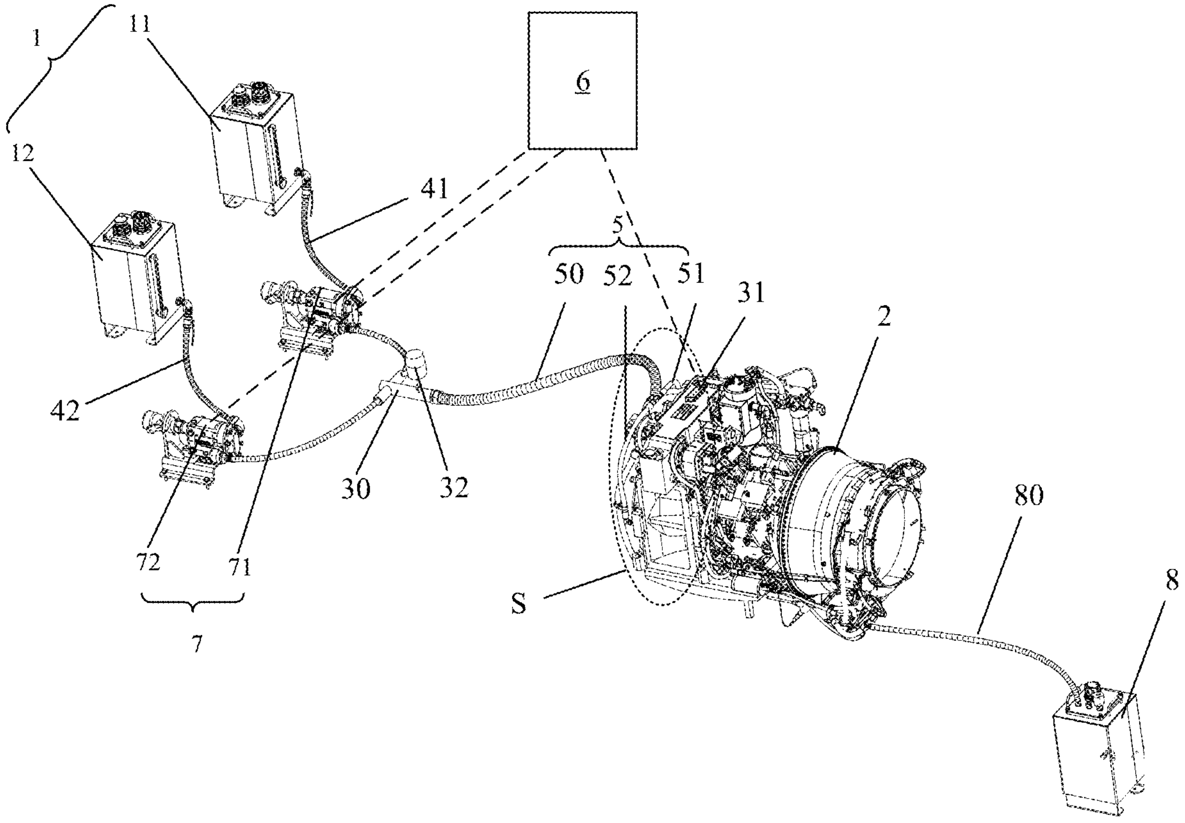
FIG. 2 is a schematic diagram of another turbine engine cleaning system provided by an embodiment of the present disclosure.

FIG. 2 is a schematic diagram of another turbine engine cleaning system provided by an embodiment of the present disclosure. The turbine engine cleaning system illustrated in FIG. 2 differs from that illustrated in FIG. 1 as follows.

As illustrated in FIG. 2, the turbine engine cleaning system further includes a pressure sensor 32 and a pressure adjustment device. The pressure sensor 32 is configured to obtain a pressure within the pipe. The pressure adjustment device is configured to adjust the pressure within the pipe. In combination with FIG. 2 and FIG. 4, the control unit 6 is further connected to the pressure sensor, the pressure adjustment device and the cleaning agent delivery device, for example, the control unit 6 is in signal connection to the pressure sensor, the pressure adjustment device and the cleaning agent delivery device; the control unit 6 is configured to obtain the pressure within the pipe from the pressure sensor 32. The control unit 6 includes a pressure judgment module, the pressure judgment module is configured to determine whether the pressure within the pipe is greater than or equal to the predetermined pressure; if the judgment result is yes, the control module of the control unit 6 is configured to control the driver mechanism 7 to drive the cleaning agent to be delivered from the cleaning agent storage device 1 into the combustion chamber 2; if the judgment result is no, the control module is configured to control the driver mechanism 7 to stop driving the cleaning agent to be delivered from the cleaning agent storage device 1 into the combustion chamber 2, and to control the pressure adjustment device to adjust the pressure within the pipe to reach the predetermined pressure. In this way, it can be ensured that there is a sufficient pressure within the pipe to spray the cleaning agent onto the object to be cleaned, thereby obtaining a better cleaning effect.

For example, the driver mechanism 7 is used as a pressure adjustment device. For example, the driver mechanism 7 is a pump, which is connected to the pipe and configured to adjust the pressure within the pipe by controlling the speed of the pump via the control unit.

Figure 3:
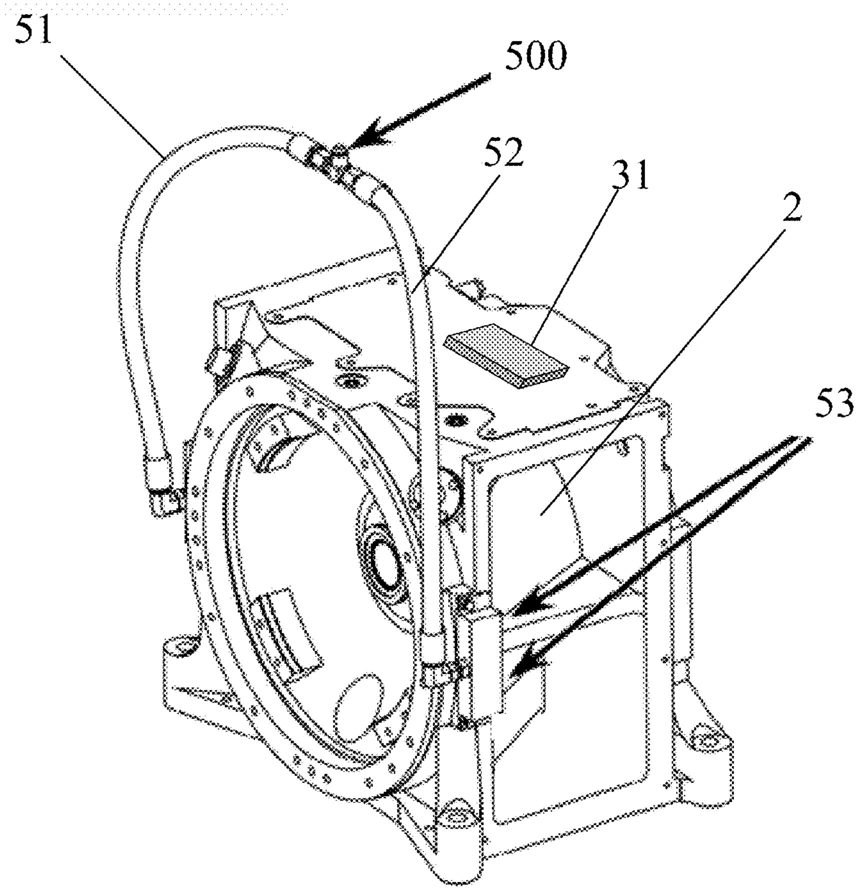
FIG. 3 is an enlarged schematic diagram of the partial S including a first sub-rear-end pipe and a second sub-rear-end pipe in FIG. 2.

FIG. 3 shows an enlarged schematic view of the partial S obtained by including a first sub-rear-end pipe and a second sub-rear-end pipe in FIG. 2. As illustrated in FIGS. 2 and 3, for example, the temperature sensor 31 is provided on an outer surface of the combustion chamber of the turbine engine for easy setting and easy sensing of the temperature within the combustion chamber.

In conjunction with FIG. 2 and the FIG. 3, for example, the rear-end pipe 5 includes a first sub-rear-end pipe 51 and a second sub-rear-end pipe 52, a first end of the first sub-rear-end pipe 51 and a first end of the second sub-rear-end pipe 52 are both communicated with the front-end pipe 4, a second end of the first sub-rear-end pipe 51 is located at a first position within the combustion chamber 2 of the turbine engine and is configured to feed the cleaning agent in the first position into the combustion chamber 2, a second end of the second sub-rear-end pipe 52 is located at a second position within the combustion chamber 2 of the turbine engine and is configured to feed the cleaning agent into the combustion chamber 2 in the second position, the first position is different from the second position, so as to simultaneously clean the components with cleaning in multiple positions at multiple angles to improve cleaning efficiency and cleaning effect. For example, the second end of the second sub-rear-end pipe 52 enters the combustion chamber 2 of the turbine engine from position 53 in FIG. 3. Similarly, the second end of the first sub-rear-end pipe 51 enters the combustion chamber 2 of the turbine engine from a position opposite to the position 53.

It should be noted that, in the turbine engine cleaning system provided by some other embodiments, the rear-end pipe may further include a third sub-rear-end pipe, a second end of the third sub-rear-end pipe is connected to the inside of the compressor of the turbine engine to clean the object to be cleaned in the compressor, such as the impeller of the compressor.

For example, both the second end of the first sub-rear-end pipe 51 and the second end of the second sub-rear-end pipe 52 include a spray structure, and the cleaning agent is sprayed onto the surface to be cleaned in the combustion chamber by the spray structure.

For example, the turbine engine cleaning system further includes a moving device (not illustrated), the moving device is configured to move a position of the second end of the first sub-rear-end pipe 51 and a position of the second end of the second sub-rear-end pipe 52, so as to clean the objects to be cleaned at more positions. For example the object to be cleaned includes turbine blades. A plurality of surfaces of the turbine blades can be cleaned by moving the position of the second end of the first sub-rear-end pipe 51 and the position of the second end of the second sub-rear-end pipe 52 to obtain a better cleaning effect. For example, the moving device is configured to translate or rotate the second end of the first sub-rear-end pipe 51 and the second end of the second sub-rear-end pipe 52. For example, the moving device includes a lifting device, a telescoping device, etc., so as to flexibly move in various directions such as up, down, left, and right. The specific implementations of the moving device can be referred to conventional technology by those skilled in the art, and are not limited in the present disclosure.

For example, the pressure sensor 32 is provided on the rear-end pipe 5 and is configured to obtain the pressure within the rear-end pipe 5. Compared to detecting and controlling the pressure within the front-end pipe, detecting and controlling the pressure within the rear-end pipe 5 is more conducive to controlling the impact force of the liquid ejection, and thus more conducive to ensuring the cleaning effect.

For example, as illustrated in FIG. 2, the cleaning agent storage device 1 includes a first storage device 11 and a second storage device 12. The first storage device 11 stores a first cleaning agent; the second storage device 12 stores a second cleaning agent. The front-end pipe includes a first sub-front-end pipe 41 and a second sub-front-end pipe 42, the first end of the first sub-front-end pipe 41 is connected to the first storage device 11 and the first end of the second sub-front-end pipe 42 is connected to the second storage device 12. The cleaning agent delivery device further includes a mixer 30, the mixer 30 is connected to a second end of the first sub-front-end pipe 41, a second end of the second sub-front-end pipe 42 and the rear-end pipe 5, and the rear-end pipe 5 is located between the mixer and the combustion chamber; the first cleaning agent enters the mixer 30 via the first sub-front-end pipe 41 and the second cleaning agent enters the mixer 30 via the second sub-front-end pipe 42, the first cleaning agent and the second cleaning agent are mixed in the mixer 30. For example, the rear-end pipe 5 further includes an intermediate pipe 50, and the intermediate pipeline 50 connects the mixer to the first sub-rear-end pipe 51 and the second sub-rear-end pipe 52. For example, a pressure sensor 32 is provided on the intermediate pipe 50 and is configured to obtain the pressure within the intermediate pipe 50, so as to conveniently obtain the pressure within the rear-end pipe after mixing a plurality of cleaning agents into the rear-end pipe.

As illustrated in FIG. 3, the first sub-rear-end pipe 51 and the second sub-rear-end pipe 52 are connected to the intermediate pipe 50 in FIG. 2 via an interface 500.

For example, the pressure adjustment device includes a first sub-pressure adjustment device and a second sub-pressure adjustment device. For example, the driver mechanism includes a first sub-driver mechanism 71 and a second sub-driver mechanism 72; the first sub-driver mechanism 71 drives the first cleaning agent to enter the first sub-front-end pipe 41 from the first storage device 11, and the second sub-driver mechanism 72 drives the first cleaning agent to enter the second sub-front-end pipe 42 from the second storage device 12. For example, the first sub-driver mechanism 71 is a first pump and the second sub-driver mechanism 72 is a second pump. For example, the first sub-driver mechanism 71 and the second sub-driver mechanism 72 are respectively serve as the first sub-pressure adjustment device and the second sub-pressure adjustment device, to simplify the structure of the turbine engine cleaning system; as illustrated in FIG. 2, the first sub-pressure adjustment device 71 is provided on the first sub-front-end pipe 41 and is configured to adjust the pressure within the first sub-front-end pipe 41; the second sub-pressure adjustment device 72 is provided on the second sub-front-end pipe 42 and is configured to adjust the pressure within the second sub-front-end pipe 42. In this way, by adjusting the pressure within the front-end pipe to adjust the pressure within the rear-end pipe, the pressure within the rear-end pipe can be adjusted conveniently, and the first sub-driver mechanism and the second sub-driver mechanism are fully utilized, thereby simplifying the structure of the turbine engine cleaning system.

Figure 5:
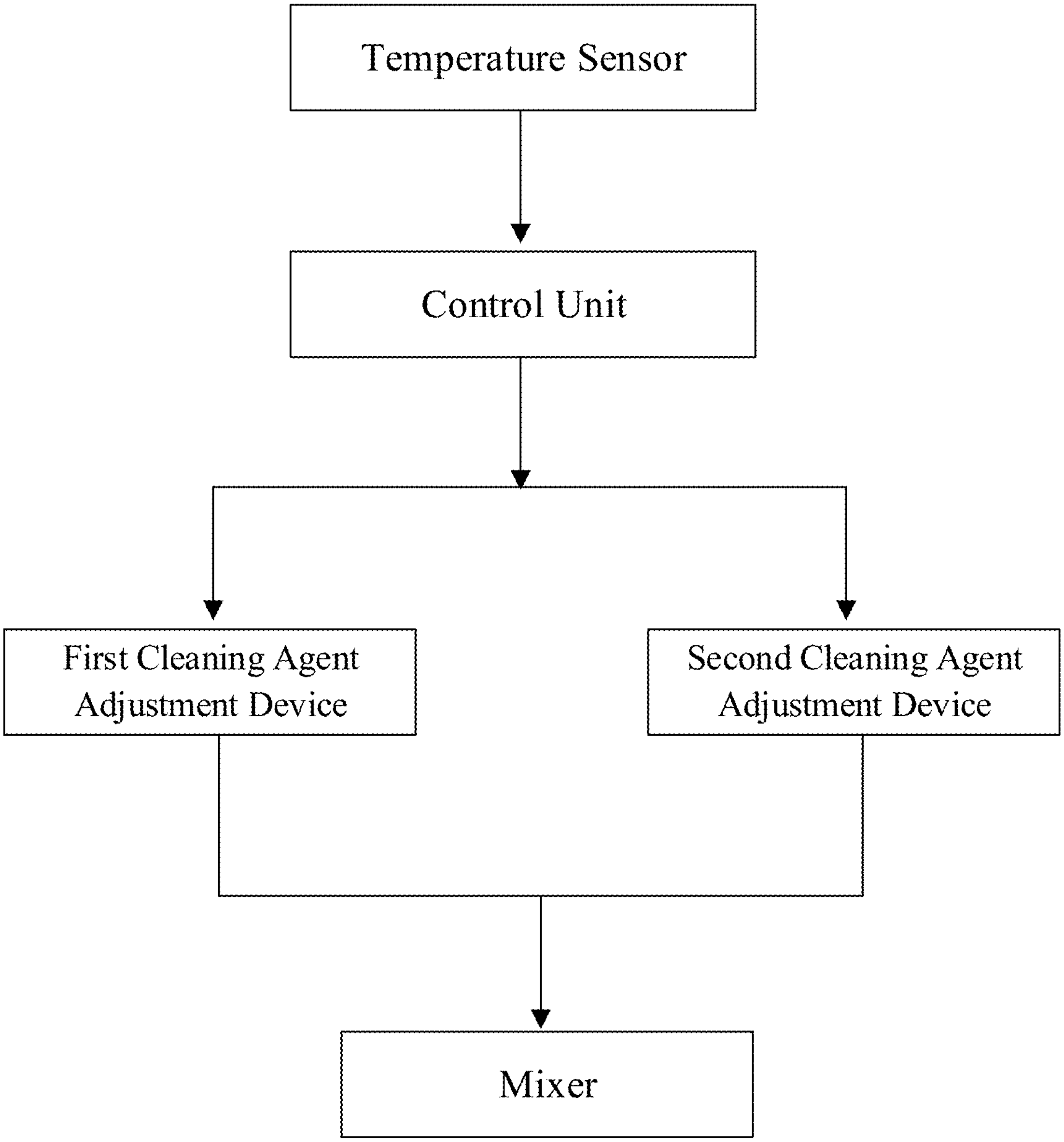
FIG. 5 is a schematic flow diagram of another turbine engine cleaning method provided by an embodiment of the present disclosure.

FIG. 5 is a schematic flow diagram of another turbine engine cleaning method provided by an embodiment of the present disclosure. In combination with FIG. 2 and FIG. 5, for example, the turbine engine cleaning system further includes a first cleaning agent adjustment device and a second cleaning agent adjustment device. The first cleaning agent adjustment device is provided on the first sub-front-end pipe 41 and is configured to control the amount of first cleaning agent entering the first sub-front-end pipe; the second cleaning agent adjustment device is provided on the second sub-front-end pipe 42 and is configured to control the amount of second cleaning agent entering the second sub-front-end pipe. The control unit 6 is connected to the temperature sensor, the first cleaning agent adjustment device and the second cleaning agent adjustment device, and is configured to control the amount of first cleaning agent entering the first sub-front-end pipe and the amount of the cleaning agent entering the second sub-front-end pipe according to the predetermined temperature. In this way, the turbine engine cleaning system can control the ratio of the cleaning agent or the concentration of the cleaning agent according to the predetermined temperature. The first cleaning agent and the second cleaning agent may be any type of substance with cleaning effect. For example, the first cleaning agent may be water or alcohol, the second cleaning agent may include detergent, and the cleaning agent with a set concentration may be obtained by mixing the first cleaning agent and the second cleaning agent in proportion. For example, the first cleaning agent and the second cleaning agent are two different cleaning agents, and the ratio of the cleaning agent can be controlled by controlling the amounts of the first cleaning agent and the second cleaning agent according to the predetermined temperature. For example, the predetermined temperature is the ambient temperature. For example, the concentration of cleaning agent can be set according to the table.1

TABLE 1

Relationship between cleaning agent concentration and predetermined temperature

| Predetermined temperature (C. °) | Concentration of the cleaning agent concentration (%) |
|---|---|
| −3 | 10 |
| −11 | 20 |
| −17 | 30 |
| −29 | 40 |
| −39 | 50 |

For example, the first sub-driver mechanism 71 and the second sub-driver mechanism 72 respectively serve as the first cleaning agent adjustment device and the second cleaning agent adjustment device, so as to simplify the structure of the turbine engine cleaning system.

It should be noted that the structure and cleaning method illustrated in FIG. 5 may be superimposed on the embodiment illustrated in FIG. 4, and the features of FIG. 4 and FIG. 5 may be combined, for example, the turbine engine cleaning system provided by some embodiments possess both the structure and the function of the embodiment illustrated in FIG. 4 and the structure and the function of the embodiment illustrated in FIG. 5.

For example, the turbine engine cleaning system illustrated in FIG. 2 further includes an image sensor (not illustrated), in combination with FIG. 4, the image sensor is located inside the combustion chamber or inside the compressor, and is configured to obtain image information of a surface to be cleaned of the component to be cleaned before cleaning the turbine engine. The control unit 6, such as a control module, is further configured to obtain this image information, to identify a degree of cleanliness of the surface to be cleaned fed back by the image information, and to control the pressure adjustment device to adjust the pressure within the pipe according to the degree of cleanliness, in order to set a suitable pressure within the pipe according to the degree of cleanliness of the surface to be cleaned, and to achieve a better cleaning effect. For example, the image sensor includes a camera. For example, the image may be automatically acquired and automatically recognized to obtain the degree of cleanliness of the surface to be cleaned, and automatically adjust the pressure within the pipe according to the degree of cleanliness; it may also manually observe the acquired image, and manually adjust the pressure within the pipe.

In combination with FIG. 2 and FIG. 4, for example, the turbine engine cleaning system further includes a cleaning agent recovery device 8 and a detection device, the cleaning agent recovery device 8 is connected to the combustion chamber of the turbine engine and is configured to recover cleaning agent discharged from the combustion chamber; for example, the cleaning agent recovery device 8 is connected via a recovery pipe 80 to a chamber of the turbine engine to be cleaned such as a combustion chamber or a chamber of the compressor. For example, the combustion chamber communicates with the chamber of the compressor. The detection device is configured to detect the degree of contamination of the cleaning agent in the cleaning agent recovery device 8. For example, at least one selected from a group consisting of turbidity, COD (chemical oxygen demand), BOD (biochemical oxygen demand) of the cleaning agent inside the cleaning agent recovery device 8 is detected as an indicator to determine the degree of contamination. Turbidity, COD, and BOD are commonly used indicators to mark the degree of liquid contamination in the art, and for specific detection methods, reference may be made to conventional techniques, which are not repeated here. The control unit 6, such as the control module of the control unit 6, is further connected to the detection device and the cleaning agent delivery device, is configured to obtain the cleanliness, and is configured to, in the case that the degree of contamination is higher than the predetermined degree of liquid contamination, control the driver mechanism 7 to drive the cleaning agent to enter the combustion chamber 2 from the cleaning agent storage device 1 to continue cleaning, and is configured to, in the case that the degree of contamination is lower than or equal to the predetermined degree of contamination, control the driver mechanism 7 to stop driving the cleaning agent to enter from the cleaning agent storage device 1 into the combustion chamber 2 to stop cleaning, so as to realize automatic cleaning control.

It should be noted that FIG. 2 takes a case where the front-end pipe includes two sub-front-end pipes and the rear-end pipe includes two sub-rear-end pipes as an example, but both the number of sub-front-end pipes and the number of the sub-rear-end pipes are not limited to two, and may be designed as needed.

For example, the control module may be, but is not limited to the following types: a memory, a central processor, a single-chip microcomputer, a microcontroller, or a programmable logic device. It should be appreciated that the memory may be either volatile memory or non-volatile memory. Among these, the non-volatile memory may be a Read-only Memory (ROM), a Programmable Read-only Memory (Programmable ROM, PROM), an Erasable Programmable Read-only Memory (Erasable PROM, EPROM), Electrically Erasable Programmable Read-Only Memory (Electrically EPROM, EEPROM), or a flash memory. The volatile memory may be a Random Access Memory (RAM), which is used as an external cache. By way of illustration, but not limitation, many forms of RAM are available, such as Static random access memory (Static RAM, SRAM), Dynamic random access memory (Dynamic RAM, DRAM), Synchronous dynamic random access memory (Synchronous DRAM, SDRAM), Double Data Rate Synchronous Dynamic Random Access Memory (Double Data Rate SDRAM, DDRSDRAM), Enhanced Synchronous Dynamic Random Access Memory (Enhanced SDRAM, ESDRAM), Synchronous Link Dynamic Random Access Memory (Synchlink DRAM, SLDRAM) and Direct memory bus random access memory (Direct Rambus RAM, DRRAM). Memory is intended to include, but is not limited to, these and any other suitable types of memory.

At least one embodiment of the present disclosure further provides a turbine engine cleaning method, the cleaning method comprises: obtaining a temperature within a combustion chamber of a turbine engine; driving a cleaning agent to be delivered from a cleaning agent storage device into the combustion chamber by a front-end pipe and a rear-end pipe connected to each other to clean a component to be cleaned in the case where the temperature within the combustion chamber is less than or equal to a predetermined temperature. The turbine engine cleaning method provided by embodiments of the present disclosure can automatically detect the temperature within the combustion chamber, the temperature within the combustion chamber gradually decreases, and in the case where the temperature within the combustion chamber is less than or equal to the predetermined temperature, the cleaning agent is driven to enter the combustion chamber to clean the components to be cleaned through the driver mechanism from the cleaning agent storage device, which may avoid damage to the components in the combustion chamber caused by cleaning in a high temperature environment.

Referring to FIG. 4, for example, the turbine engine cleaning method further includes: obtaining the pressure within the pipe; driving the cleaning agent from the storage device into the combustion chamber in the case where the pressure is greater than or equal to the predetermined pressure, and stopping driving cleaning agent from a cleaning agent storage device into the combustion chamber and adjusting the pressure within the pipe to reach the predetermined pressure in the case where the pressure is less than the predetermined pressure.

For example, the turbine engine cleaning method further includes: mixing a first cleaning agent and a second cleaning agent to obtain a cleaning agent mixture, feeding the cleaning agent mixture into a pipe, obtaining a pressure within the pipe; and driving the cleaning agent mixture into the combustion chamber in the case where the pressure is greater than or equal to a predetermined pressure, and in the case where the pressure is less than a predetermined pressure, stopping driving the first cleaning agent and the second cleaning agent to enter the combustion chamber and adjusting the pressure within the pipe to reach the predetermined pressure.

For example, the turbine engine cleaning method further includes: obtaining image information of the surface to be cleaned of the component to be cleaned before cleaning the turbine engine; identifying the degree of cleanliness of the surface to be cleaned fed back by the image information and adjusting the pressure within the pipe according to the degree of cleanliness.

For example, the turbine engine cleaning method further includes: recovering the cleaning agent discharged from the combustion chamber; detecting the degree of contamination of the cleaning agent in the cleaning agent recovery device, driving the cleaning agent to enter the combustion chamber from the cleaning agent storage device to continue cleaning in the case where the degree of contamination is higher than the predetermined degree of contamination, and stopping driving the cleaning agent to enter the combustion chamber from the cleaning agent storage device to stop cleaning in the case where the level of contamination is lower than equal to the predetermined degree of contamination.

The details of the above cleaning method and the technical effects achieved, as well as the features of the turbine engine cleaning method not mentioned above, may be referred to the descriptions in the previous embodiments of the turbine engine cleaning system, and will not be repeated here. The features and technical effects in the embodiments of the turbine engine cleaning system are applicable to all protected subjects of the present disclosure.

The following points need to be noted:

(1) In the drawings of the embodiments of the present disclosure, only the structures related to the embodiments of the present disclosure are involved, and other structures may refer to the common design(s).

(2) In case of no conflict, features in one embodiment or in different embodiments of the present disclosure can be combined.

The above are merely particular embodiments of the present disclosure but are not limitative to the scope of the present disclosure; any of those skilled familiar with the related arts can easily conceive variations and substitutions in the technical scopes disclosed by the present disclosure, which should be encompassed in protection scopes of the present disclosure. Therefore, the scopes of the present disclosure should be defined in the appended claims.

What is claimed is:

1. A turbine engine cleaning system, comprising:

a temperature sensor configured to obtain a temperature within a combustion chamber of a turbine engine;

a first cleaning agent storage device configured to store a first liquid cleaning agent and a second cleaning agent storage device configured to store a second liquid cleaning agent; and a cleaning agent delivery device connected the first cleaning agent storage device and the second cleaning agent storage device to the combustion chamber of the turbine engine, the cleaning agent delivery device comprising:

a pipe comprising a front-end pipe and a rear-end pipe, wherein the front-end pipe is connected to the first cleaning agent storage device and the second cleaning agent storage device, and the rear-end pipe is connected to the front-end pipe and the combustion chamber; and a driver mechanism which is connected to the front-end pipe and configured to drive the first liquid cleaning agent and the second liquid cleaning agent from the first cleaning agent storage device and the second cleaning agent storage device, as a mixed cleaning agent into the combustion chamber through the front-end pipe and the rear-end pipe for cleaning when the temperature within the combustion chamber is less than or equal to a predetermined temperature and when a pressure within the pipe is greater than or equal to a predetermined pressure, wherein the mixed cleaning agent is a mixture of the first liquid cleaning agent and the second liquid cleaning agent, and wherein a mixing ratio between the first liquid cleaning agent and the second liquid cleaning agent in the mixed cleaning agent is set as a function of the predetermined temperature.

2. The turbine engine cleaning system according to claim 1, wherein the predetermined temperature is an ambient temperature.

3. The turbine engine cleaning system according to claim 1, wherein the temperature sensor comprises an infrared temperature sensor, and the temperature sensor is disposed outside the combustion chamber.

4. The turbine engine cleaning system according to claim 1, wherein the turbine engine cleaning system further comprises:

a control unit which is connected to the temperature sensor and the cleaning agent delivery device, and configured to receive temperature information within the combustion chamber obtained by the temperature sensor, and configured to control the driver mechanism to drive the first liquid cleaning agent and the second liquid cleaning agent to the combustion chamber by the front-end pipe and the rear-end pipe when the temperature within the combustion chamber is less than or equal to the predetermined temperature, and configured to control the mixing ratio of the first liquid cleaning agent and the second liquid cleaning agent in the mixed cleaning agent according to the predetermined temperature.

5. The turbine engine cleaning system according to claim 4, wherein the turbine engine cleaning system further comprises:

a pressure sensor configured to obtain a pressure within the pipe; and a pressure adjustment device configured to adjust the pressure within the pipe, wherein the control unit is further connected to the pressure sensor, the pressure adjustment device and the cleaning agent delivery device, and is configured to obtain the pressure within the pipe, and is configured to control the driver mechanism to drive the first liquid cleaning agent and the second liquid cleaning agent into the combustion chamber when the pressure is greater than or equal to the predetermined pressure, and is configured to control the driver mechanism to stop driving the first liquid cleaning agent and the second liquid cleaning agent into the combustion chamber, and control the pressure adjustment device to adjust the pressure within the pipe to reach the predetermined pressure, when the pressure is lower than the predetermined pressure.

6. The turbine engine cleaning system according to claim 5, wherein the turbine engine cleaning system further comprises:

an image sensor configured to obtain image information of a surface to be cleaned before cleaning the turbine engine; and wherein the control unit is further configured to obtain the image information, to identify a degree of cleanliness of the surface to be cleaned fed back by the image information, and to control the pressure adjustment device to adjust the pressure within the pipe according to the degree of cleanliness.

7. The turbine engine cleaning system according to claim 5, wherein: the rear-end pipe comprises a first sub-rear-end pipe and a second sub-rear-end pipe, a first end of the first sub-rear-end pipe and a first end of the second sub-rear-end pipe are both communicated with the front-end pipe, a second end of the first sub-rear-end pipe is at a first position within the combustion chamber of the turbine engine and is configured to feed the mixed cleaning agent into the combustion chamber at the first position, a second end of the second sub-rear-end pipe is at a second position within the combustion chamber of the turbine engine and is configured to feed the mixed cleaning agent into the combustion chamber at the second position, and the first position is different from the second position.

8. The turbine engine cleaning system according to claim 7, wherein the turbine engine cleaning system further comprises:

a moving device configured to move a position of the second end of the first sub-rear-end pipe and a position of the second end of the second sub-rear-end pipe.

9. The turbine engine cleaning system according to claim 7, wherein the front-end pipe comprises a first sub-front-end pipe and a second sub-front-end pipe, the first end of the first sub-front-end pipe is connected to the first cleaning agent storage device and the first end of the second sub-front-end pipe is connected to the second cleaning agent storage device; and wherein the cleaning agent delivery device further comprises:

a mixer connected to a second end of the first sub-front-end pipe, a second end of the second sub-front-end pipe and the rear-end pipe, wherein the rear-end pipe is between the mixer and the combustion chamber, the first liquid cleaning agent enters the mixer via the first sub-front-end pipe, and the second liquid cleaning agent enters the mixer via the second sub-front-end pipe, and the first liquid cleaning agent and the second liquid cleaning agent are mixed in the mixer.

10. The turbine engine cleaning system according to claim 9, wherein the pressure sensor is disposed on the rear-end pipe and is configured to obtain a pressure within the rear-end pipe.

11. The turbine engine cleaning system according to claim 9, wherein the pressure adjustment device comprises:

a first sub-pressure adjustment device which is disposed on the first sub-front-end pipe and configured to adjust a pressure within the first sub-front-end pipe; and a second sub-pressure adjustment device disposed on the second sub-front-end pipe and configured to adjust a pressure within the second sub-front-end pipe.

12. The turbine engine cleaning system according to claim 9, wherein the turbine engine cleaning system further comprises:

a first cleaning agent adjustment device configured to control an amount of the first liquid cleaning agent entering the first sub-front-end pipe; and a second cleaning agent adjustment device configured to control an amount of the second liquid cleaning agent entering the second sub-front-end pipe;

wherein the control unit is connected to the temperature sensor, the first cleaning agent adjustment device and the second cleaning agent adjustment device, and is configured to control the amount of the first liquid cleaning agent entering the first sub-front-end pipe and the amount of the second liquid cleaning agent entering the second sub-front-end pipe according to the predetermined temperature.

13. The turbine engine cleaning system according to claim 4, wherein the turbine engine cleaning system further comprises:

a cleaning agent recovery device which is connected to the combustion chamber of the turbine engine and configured to recover cleaning agent discharged from the combustion chamber; and a detection device configured to detect a degree of contamination of the cleaning agent in the cleaning agent recovery device, wherein the control unit is further connected to the detection device and the cleaning agent delivery device, is configured to obtain a degree of cleanliness, and is configured to control the driver mechanism to drive the first liquid cleaning agent and the second liquid cleaning agent into the combustion chamber to continue cleaning when the degree of contamination is higher than a predetermined degree of contamination, and is configured to control the driver mechanism to stop driving the first liquid cleaning agent and the second liquid cleaning agent into the combustion chamber to stop cleaning when the degree of contamination is lower than or equal to the predetermined degree of contamination.

14. The turbine engine cleaning system according to claim 1, wherein a component to be cleaned comprises a turbine blade within the combustion chamber, the mixed cleaning agent is delivered to the turbine blade to clean the turbine blades; or the turbine engine comprises a compressor, and the rear-end pipe is further connected to inside of the compressor, to clean the component to be cleaned inside the compressor.

15. A cleaning method adopting the turbine engine cleaning system according to claim 1, comprising:

obtaining the temperature within the combustion chamber of the turbine engine by the temperature sensor;

driving the first liquid cleaning agent to be delivered from the first cleaning agent storage device and the second liquid cleaning agent to be delivered from the second cleaning agent storage device into the combustion chamber through the front-end pipe and the rear-end pipe to clean the component to be cleaned in the case where the temperature within the combustion chamber is less than or equal to the predetermined temperature.

* * * * *